3 Sheets—Sheet 3.

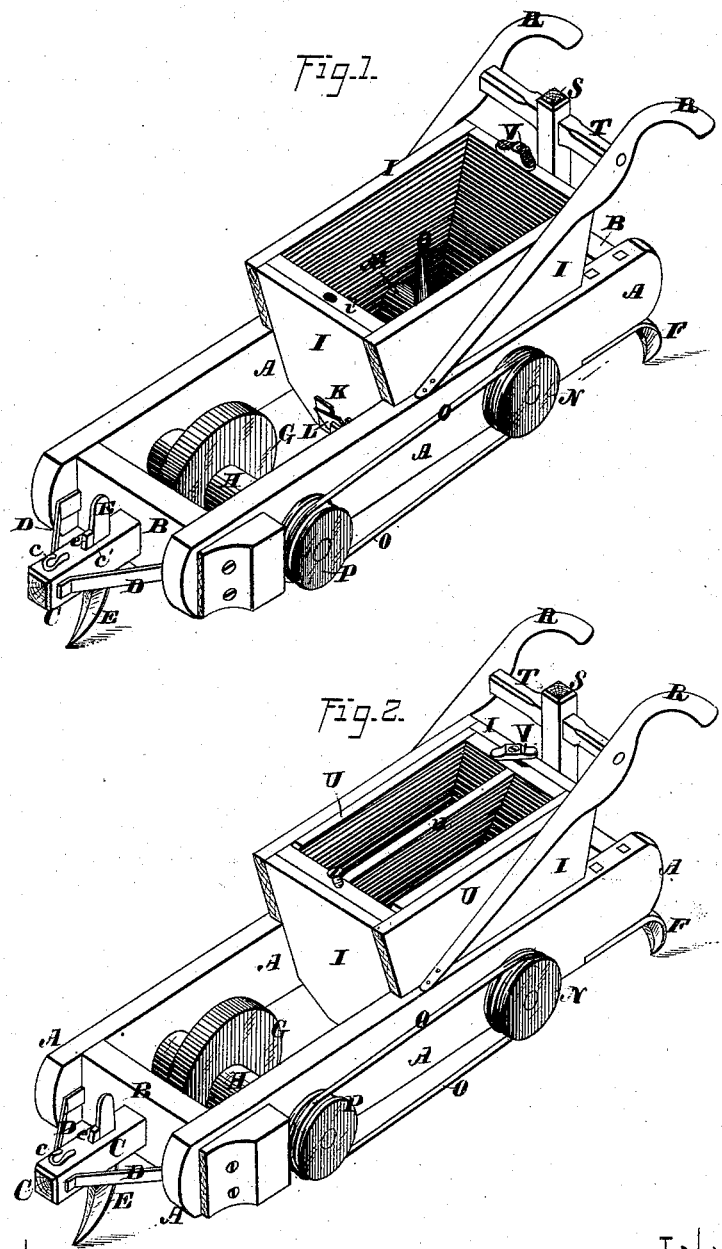

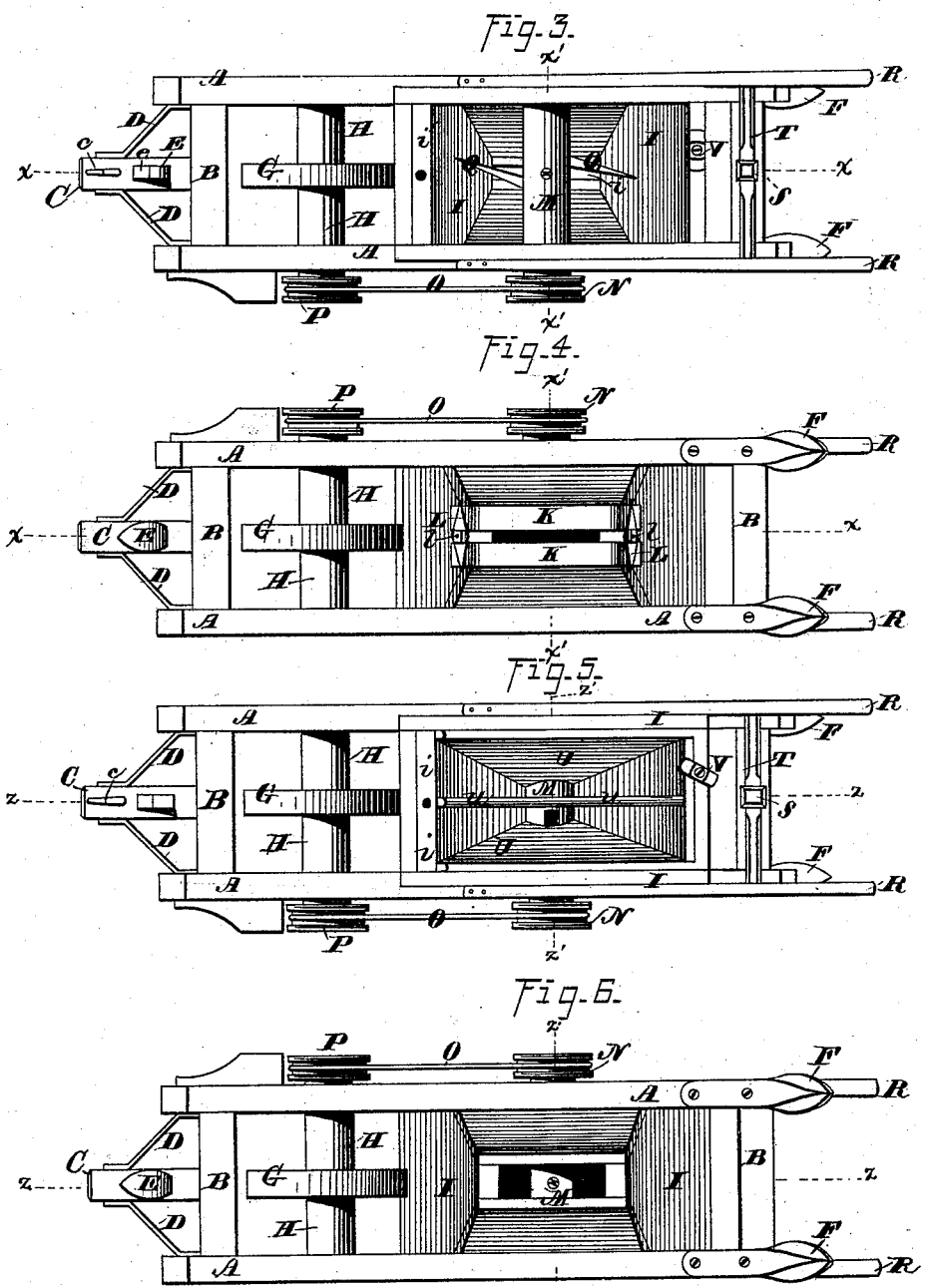

M. T. SIMS & L. B. IRVIN.
Seed-Planters.

No. 211,270. Patented Jan. 7, 1879.

WITNESSES
Jas. E. Hutchinson
Henry C. Hazard

INVENTORS
M. T. Sims and L. B. Irvin,
by Prindle & Cochran Attys

UNITED STATES PATENT OFFICE.

MARTIN T. SIMS AND LESLEY B. IRVIN, OF MARCUS, GEORGIA.

IMPROVEMENT IN SEED-PLANTERS.

Specification forming part of Letters Patent No. 211,270, dated January 7, 1879; application filed September 4, 1878.

*To all whom it may concern:*

Be it known that we, M. T. SIMS and L. B. IRVIN, of Marcus, in the county of Jackson, and in the State of Georgia, have invented certain new and useful Improvements in Seed-Planters; and do hereby declare that the following is a full, clear, and exact description thereof, reference being had to the accompanying drawings, making a part of this specification, in which—

Figure 7:
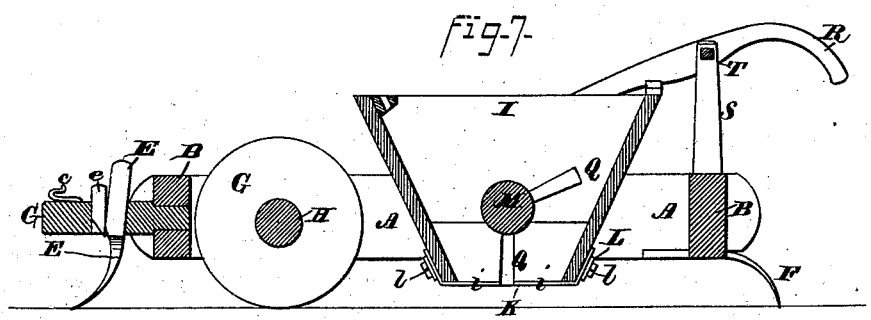
Figure 8:
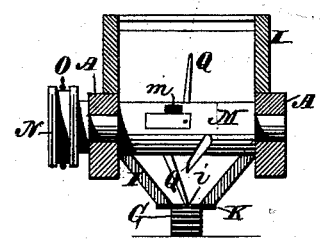
Figure 9:
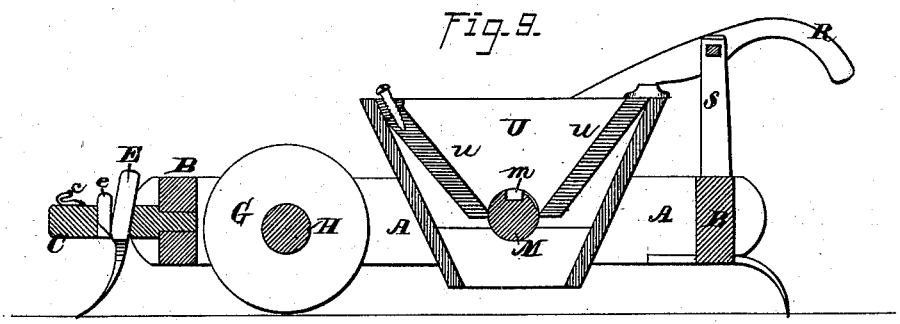
Figure 10:
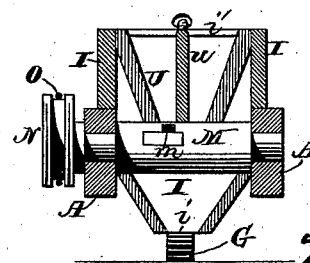

Figure 1 is a perspective view of our machine as arranged for planting cotton-seed, a portion of the hopper being removed to show the interior construction. Fig. 2 is a like view of said machine as arranged for planting corn, pease, &c. Figs. 3 and 4 are, respectively, plan views of the upper and lower sides of the same when arranged as shown in Fig. 1. Figs. 5 and 6 are, respectively, plan views of the upper and lower sides of the hopper when arranged for corn and pease. Figs. 7 and 8 are, respectively, longitudinal and transverse sections of the hopper upon lines $x\ x$ and $x'\ x'$ of Figs. 3 and 4; and Figs. 9 and 10 are, respectively, like views upon lines $z\ z$ and $z'\ z'$ of Figs. 5 and 6.

Letters of like name and kind refer to like parts in each of the figures.

The design of our invention is to enable cotton and other seeds and fertilizers to be planted or sown with one machine; and to this end it consists in combining, with the permanent fixed hopper and with the dropper and agitator shaft, a supplemental hopper divided into two compartments, and caused to fit within said fixed hopper and over said shaft, substantially as and for the purpose hereinafter specified.

In the annexed drawings, A and A represent two side bars, which are secured together in parallel lines by means of two cross-bars, B and B, that extend between their ends, the whole forming the frame of our machine.

To the center of the front cross-bar, B, is secured a draft-bar, C, which extends forward a short distance, and is provided with a hook, c, or other suitable means for attaching a horse or horses. Brace-rods D, attached to the inner faces at the forward ends of the side bars, A, and from thence extending forward to or near the front end of said draft-bar, strengthen the latter and insure its position.

Within the draft-bar C is formed a vertical slot, $c'$, through which is passed the shank of a shovel, E, that is held in place by means of a wedge, $e$, which is driven downward into said slot in front of said shank. By loosening said wedge said shovel may be raised or lowered and then again secured in position, as before stated.

Secured to the rear end of each side rail, A, is a plow or shovel, F, which has a rearward and downward curve, and operates to cover seed dropped into the furrow made by the shovel E.

The weight of the front portion of the machine is supported upon or by a wheel, G, which is attached to a shaft, H, that is journaled within the side rails, A, said wheel being arranged to travel in the furrow made by the shovel E.

Secured between the side rails, A, is a hopper, I, which has the form shown in Fig. 1, and at its lower side is provided with an opening, $i$, that has its longest dimensions in a line with the draft. Said opening is varied in width by means of two metal plates, K, one of which is fitted over the bottom of said hopper, upon each side of said opening, and has its ends turned upward upon the front and rear sides of said hopper, where each of said ends is secured in place by means of a clamp, L, that extends across the same and across the end of the opposite plate K, and at its longitudinal center is provided with a bolt, $l$, which enables the necessary pressure to be applied. By loosening the bolts $l$ and $l$ the plates K may be moved toward or from each other, so as to decrease or increase the lateral dimensions of the opening $i$, as may be desired.

Within the lower portion of the hopper I is journaled a shaft, M, which is provided upon one of its ends with a pulley, N, that receives a band, O, which passes around a similar wheel, P, that is attached to the end of the shaft H, the arrangement being such as to cause said shaft M to revolve whenever the machine is moved forward. Secured within the shaft M at and upon each side of its longitudinal center are a number of metal bars, Q, which extend radially outward, and operate as agitators to cause the contents of the hopper I to pass downward through the opening $i$.

The bars Q, which are at the longitudinal center of the shaft M, are arranged at a right angle to its axis; but those upon either side of such center are inclined inward, so as to cause their outer ends to be in a line, circumferentially, with the outer ends of said central bars. The result of this arrangement of the bars Q is, that the entire contents of the hopper I is thoroughly stirred up and moved toward its transverse center, while if all of said bars were arranged at a right angle to the axis of the shaft M, the contents of said hopper would not be so freely moved toward and caused to pass through the opening $i$.

The movements of the machine are directed by means of two handles, B, which are secured upon the sides of the hopper I and extend rearward and upward. A post, S, extending upward from the rear cross-bar, B, is connected with a rung, T, which extends between said handles and strengthens and supports the latter.

As described, the machine is arranged for planting cotton-seed, during which operation the front shovel opens a furrow, the wheel completes the same, the agitators or stirrers cause seed to be dropped into said furrow, and the covering-shovels move the soil over and cover said seed.

For use in planting corn, pease, &c., the agitators Q are removed from the shaft M, and a second hopper, U, is placed within the hopper I, the front end of said hopper U being passed under a cross-bar, $i'$, that is secured upon and extends across the front end of said hopper I, while the rear end of said supplemental hopper U is held down by means of a button, V, which is pivoted upon the rear end at the upper side of said hopper I.

The lower end of the hopper U fits down around the shaft M, so as to prevent the contents of the former from passing downward, except as desired. Within the periphery of said shaft is provided a series of recesses or cups, $m$, which, by the rotation of said shaft, become filled with grain, and carry the same rearward and downward and drop it into the furrow. By increasing or diminishing the size of said cups the quantity of grain dropped will be correspondingly varied.

In order that two kinds of seed or grain may be planted at one time, the hopper U is divided by means of a vertical partition, $u$, which extends through its center from front to rear, while within the shaft M the seed-cups $m$ are arranged in two series, one of which is upon each side of said partition. Said seed-cups are relatively arranged so that those of each series are alternately brought into position, are filled, and then discharged.

If, now, corn is placed in one of the compartments of the hopper U and pease in the second compartment, there will be planted alternate hills of each of said seeds, no other attention being required than to keep the said compartments filled.

Having thus fully set forth the nature and merits of our invention, what we claim as new is—

In combination with the hopper I and with the shaft M, provided with the recesses $m$, and adapted to receive the detachable radial agitator-bars O, the removable supplemental hopper U, fitted within said fixed hopper and over said shaft, and divided interiorly into two compartments, substantially as and for the purpose specified.

In testimony that we claim the foregoing we have hereunto set our hands this 2d day of September, 1878.

MARTIN T. SIMS.
LESLEY $+$ B. IRVIN.
his mark.

Witnesses:
 JAS. O. WYNN,
 G. H. PRIOR.